United States Patent [19]

Astle

[11] 4,440,531
[45] Apr. 3, 1984

[54] REAMING AND COUNTERBORING CUTTING TOOL

[75] Inventor: William H. Astle, Rancho Cordova, Calif.

[73] Assignee: Tri Tool Inc., Rancho Cordova, Calif.

[21] Appl. No.: 361,115

[22] Filed: Mar. 23, 1982

[51] Int. Cl.³ .................. B23B 41/10; B23P 15/26
[52] U.S. Cl. ........................ 408/82; 29/157.4; 29/426.4; 29/726; 408/224; 408/229
[58] Field of Search .......... 408/82, 100, 110, 203.5, 408/206, 223, 224, 225, 229, 703; 144/205; 29/33 T, 157.4, 426.1, 426.4, 402.06, 402.07, 726

[56] References Cited

U.S. PATENT DOCUMENTS

| Re. 16,817 | 12/1927 | Smith | 408/224 |
|---|---|---|---|
| D. 202,998 | 11/1965 | Eckel et al. | D54/4 |
| 469,057 | 2/1892 | Chesnut | 408/207 |
| 1,405,020 | 1/1922 | Skelton | 408/229 |
| 2,300,914 | 11/1942 | Flindt | 29/157.4 X |
| 2,411,246 | 11/1946 | Clapper | 29/157.4 |
| 2,630,725 | 3/1953 | Black | 408/224 |
| 2,786,373 | 3/1957 | Patton | 408/224 X |
| 2,901,222 | 8/1959 | Pease, Jr. | 408/224 X |
| 3,309,945 | 3/1967 | Halpern | 408/224 X |
| 3,473,421 | 10/1969 | Grussner | 408/225 |
| 3,564,945 | 2/1971 | Bradley | 408/224 |
| 3,591,302 | 7/1971 | Andreasson | 408/224 |

FOREIGN PATENT DOCUMENTS 203866  9/1923  United Kingdom ............... 408/223

*Primary Examiner*—Z. R. Bilinsky
*Attorney, Agent, or Firm*—Bacon & Thomas

[57] ABSTRACT

A rotary reaming and counterboring tool includes a central body (28), a proximal mounting flange (30) and a distal end (36), longitudinal lands (44) and straight flutes (40) between the lands. The lands overhang the distal end of the cutter body and are provided with forward facing (relative to the cutting direction) radial reaming cutting edges (64) at the distal ends of the lands and counterboring radial cutting edges (68) at radially stepped portions of the lands. The lands are generally trapezoidal in cross section and a central bore (56) extends through the central body for accommodating a mandrel that supports the cutting tool and its driving head during operation of the tool to perform a reaming and counterboring operation.

2 Claims, 6 Drawing Figures

REAMING AND COUNTERBORING CUTTING TOOL

BACKGROUND OF THE INVENTION

The present invention is concerned with a reaming and counterboring cutting tool bit intended to be driven in rotation for the purpose of removing a preexisting weld between a tube (e.g., a steam tube) that has been inserted into a bore in the side wall of a header (fluid distributor) and the side wall of the bore, while at the same time refacing a reference surface or seat on the interior wall of the header around the bore to permit automatic welding equipment to be precisely located relative to the refinished tube end within the bore. This permits the tube end to be rewelded to the bore side wall from within the header in a well-known manner using automatic electric arc welders.

DESCRIPTION OF THE PRIOR ART

The prior art method of removing the old weld from the end of a tube attached to a header (for example, a superheater tube in a steam power plant environment) was to use a complex cable system whereby a stepped cutter blade inserted into the interior of the header into engagement with the old tube weld was fed into the weld area by a cable to which tension force was applied from a remote location to which the cable had been previously extended. Typically, a cable would be strung from one header to another, the cutter would be attached to one end of the cable through a swivel, and the cable would be tensioned by means of a tensioning device from the other header. Application of tension to the cable would feed the cutter axially into engagement with the tube end, while the cutter itself was rotated through a universal joint by means of a torque tube or rod that was driven in rotation by means of a suitable motor. By careful control of the tensioning of the cable while the cutter was rotated, the old weld would be reamed out and the inside surface of the header adjacent the tube bore would be counterbored to refinish the machine reference surface. The prior art cutter itself is typical of many examples in the prior art of stepped cutting tools with radial cutting edges and straight flutes. For example, stepped reaming tools can be observed in U.S. Pat. No. 469,057 granted in 1892 and U.S. Pat. No. 2,786,373 granted in 1957.

The cable system is somewhat slow and expensive, problems are encountered if the cable breaks, and furthermore the precise coordination of the tension on the cable at one location and the cutting operation at the other location requires careful control.

A related invention assigned to the assignee of the present application relates to a cutter tool head for insertion into the limited space of a typical header and the present invention is concerned with the cutting bit for accomplishing the removal of the old weld between the tube end and the side wall of the tube bore in the header without resorting to a cable system. The present invention therefore is concerned specifically with an improved form of reaming and counterboring tool that is particularly well-adapted for the environment described above and which, moreover, is particularly well-suited for dependable operation in combination with a stationary mandrel shaft extending centrally through the cutter body.

BRIEF DESCRIPTION OF THE INVENTION

The present invention is a rotary reaming and counterboring tool particularly well-suited for reaming out the old weld area between a tube, for example a superheater tube, and a bore of a header into which the tube has been previously inserted and welded in place from within the header. It is typical practice to weld such tubes from within the header and this presents a problem when it is desired to renew the weld and recondition the header assembly.

The cutter is adapted to cooperate with a tool head that drives the cutter in rotation within the header and which is coupled to the tube through a longitudinally extending mandrel that grips the interior of the tube and locks the tool head in place during the cutting operation. The cutter which constitutes the present invention is then driven axially in a feed direction along the mandrel shaft into engagement with the tube end weld for removing the old weld and cleaning the header bore, and ultimately resurfacing a reference seat area adjacent the bore for accommodating automatic welding equipment that rewelds the tube to the bore side wall.

The requirements for the tool are that it be sturdy, precise, easily resharpened, and capable of accommodating the mandrel shaft without compromising the strength of the cutter.

Accordingly, the present invention essentially is characterized by a central tool body extending axially along the tool rotary axis between a proximal and a distal end, the proximal end being attached to the rotary tool head and the distal end extending towards the tube end that is to be reconditioned. The cutter includes a plurality of longitudinally and radially extending lands on the central body between the proximal and distal ends, with straight flutes between the lands. The lands are each radially stepped so as to provide a pair of radial cutting edges located respectively at the distal end and at the stepped area, the dimension between the cutter edges constituting the critical dimension between the resurfaced tube end and the referenced surface on the interior of the header.

The proximal end of the tool includes a radial enlargement or a flange for accommodating apertures through which suitable removable fasteners extend for mounting the cutter to the tool head, and the distal ends of the lands overhang the central body to provide suitable clearance for the mandrel shaft and for the individual distal cutting edges.

Each of the lands of the tool is generally trapezoidal in cross section with a flat radial forward face (the forward direction here referring to the direction of rotation of the face or element, a circumferential outer edge and a rear face intersecting the rear end of the outer edge and inclined away from the forward face in a direction towards the central body. Thus, the base of the lands is considerably thicker than the outboard edges thereof.

The longitudinally extending outer edges of the lands are raked radially inwardly to provide clearance for the cutting edges and the entire arrangement is one that provides a structurally strong tool bit that nevertheless can accommodate a fixed mandrel shaft extending longitudinally through the cutter body. The cutter tool is relatively simple to fabricate and grind to final dimensions, can be easily reground for resharpening and is easily mounted and removed from the rotary tool head through a strong, for example bolted, connection. The cutter can withstand high torque and impact loads due to the land structure and the overall cutter configuration.

Further and other objectives and benefits of the invention will be apparent from a consideration of the preferred embodiment of the invention described below in conjunction with the appended drawings.

DETAILED DESCRIPTION OF ILLUSTRATED EMBODIMENT

Figure 5:
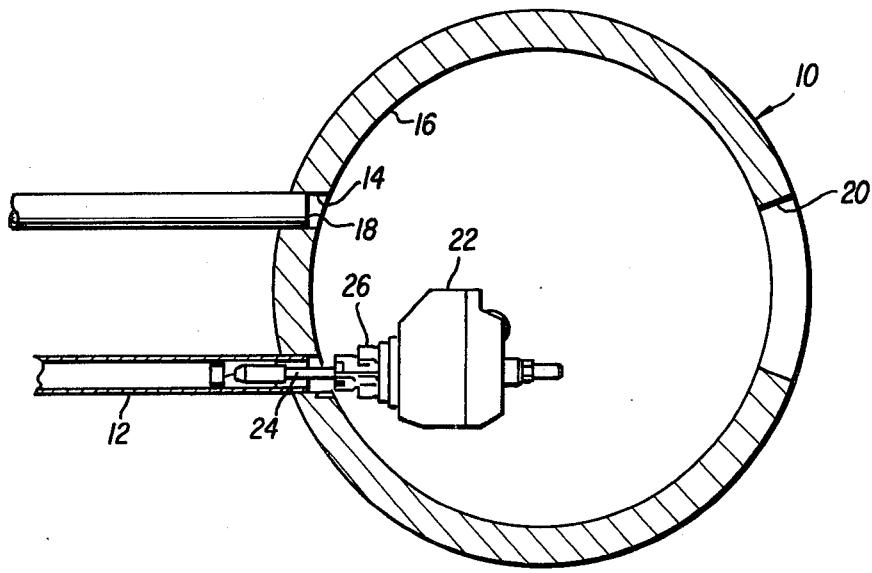
FIG. 5 is a schematic view showing the operational environment of the tool, including a driving head.

The present invention relates to a cutter bit for performing a reaming and counterboring operation in any environment, but is particularly well-adapted for carrying out such an operation in connection with cleaning out the weld area between a tube and the side wall of a bore in a fluid or steam header into which the tube has been fit and previously welded from inside the header. The tube and header construction are conventional and are schematically illustrated in FIG. 5, whereat a header 10 such as is typically used in a steam or hot water supply system is connected to a superheated steam tube or fluid carrying tube 12, the latter being fit into bores 14 extending through the side wall 16 of the header 10. The tubes 12 have previously been welded to the side wall 16 as illustrated at 18 from within the header 10.

Figure 6:
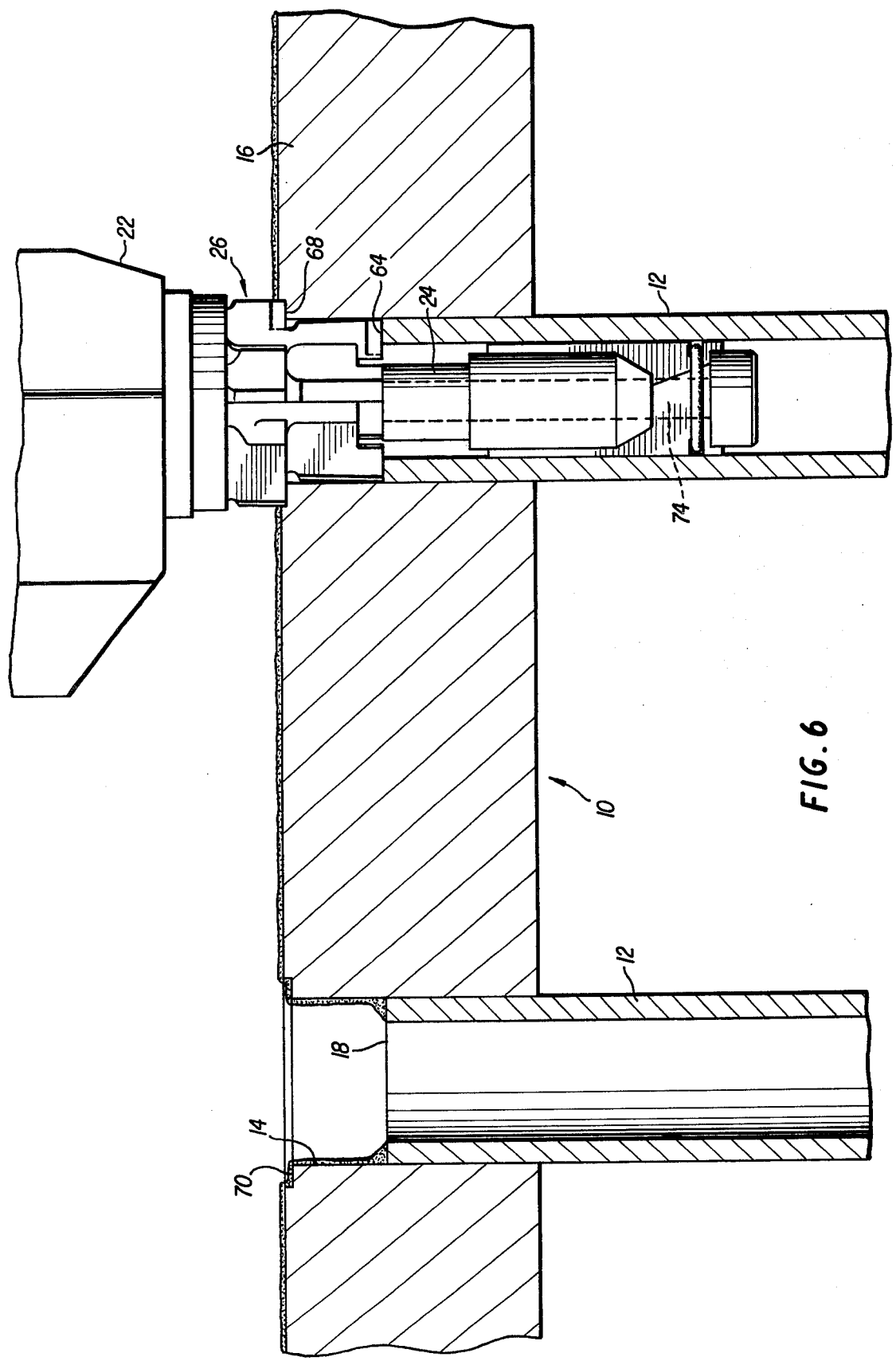
FIG. 6 is a side elevational, partial cutaway view showing the tool in operation.

When it is desired to recondition the headers 10 and to renew the welds 18, it is necessary to first ream out the old weld area 18 without disturbing the bore side walls 14 and also to form a new seat (to be described when FIG. 6 is discussed) on the interior surface of the side wall 16 so that electric welding equipment can be precisely located to reweld the end of tubes 12 to the side walls of bores 14.

A particular problem is encountered when it is desired to ream out the old weld area 18, since the only access to the interior of the header 10 is through small inspection ports 20 that are on the order of approximately 3 inches (7.6 cm) in width and even smaller in height. Although not constituting a part of this invention, a tool driving head 22 capable of being inserted through opening 20 and connected to tube 12 by means of a rigid mandrel 24 is provided to drive the rotary reaming and counterboring tool 26 of the present invention about a central axis of rotation and furthermore in an axial feed direction towards the end of tube 12.

The present invention is concerned with the configuration of the cutting tool 26 which is shown in its operational environment in FIG. 6 and is also shown as an isolated element in FIGS. 1-4.

Figure 1:
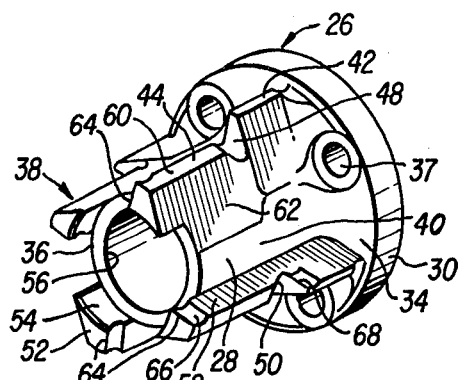
FIG. 1 is a pictorial isometric view showing the rotary reaming and counterboring cutting tool embodying the present invention from a left forward elevated angle.
Figure 3:
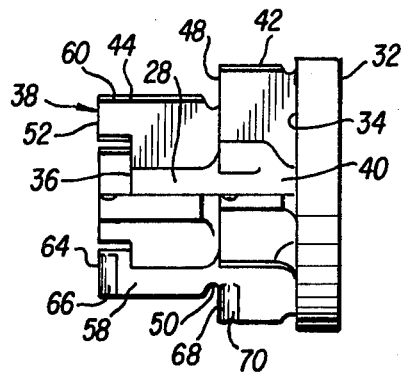
FIG. 3 is a side elevational view of the tool.

With reference to FIG. 1, the rotary reaming and counterboring tool configured in accordance with the present invention includes an axially extending central tool body 28 symmetrically disposed about the longitudinal rotational axis of the cutting tool, which extends centrally through the cutting tool from left to right as viewed in FIG. 3. The central body 28 includes a proximal, enlarged end 30 resembling, in the illustrated embodiment, a flange provided with a flat rear surface 32 (FIGS. 3 and 4) and a radial surface 34 generally facing toward the distal end 36 of central body 28. It will be evident from viewing FIGS. 1 and 3 that the proximal end 30 of the central body 28 is larger than the distal end 36 of the cutting tool.

Figure 4:
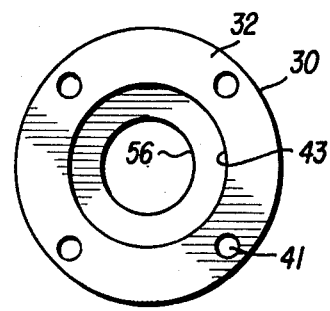
FIG. 4 is a rear end view of the tool.

The proximal end 30 of the tool is provided with axially extending apertures 41 that are intended to receive removable fasteners for mounting the cutting tool to the rotating part of the driving head 22 (FIG. 5). As seen in FIG. 4, a counterbore 43 is provided on the proximal face of the proximal end 30.

A plurality of longitudinally and radially extending lands 38 project outwardly from the central body 28 and are separated from each other by straight flutes 40.

Each land 38 is radially stepped, as illustrated, to provide a radially larger land portion 42 located towards the proximal end 30 of the tool and a smaller portion 44 extending from the larger portion 42 towards the distal end 36 of the tool. The intersection of the smaller and larger portions of the lands constitutes a radially stepped area and a radial end surface 48 is provided at the stepped area. An undercut 50 is preferably provided in the stepped area at the base of the end face 48.

The distal end face 52 of the smaller portion 44 of each land overhangs the distal end 36 of the central body 28 in an axial direction. This provides inner land surfaces 54, as best seen in FIGS. 1 and 2.

The central body is provided with an axially extending bore 56 and the inner land surfaces 54 are radially spaced outwardly from the diameter of the bore 56.

Figure 2:
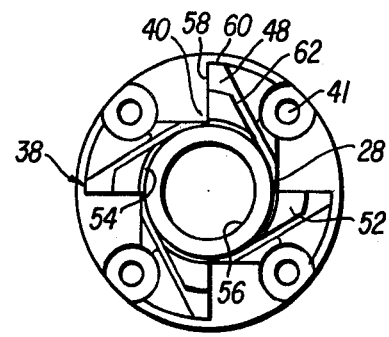
FIG. 2 is a frontal end view of the tool.

Each land 38, as best seen in FIG. 2, is roughly trapezoidal in cross sectional shape, with a wider base than outer periphery. Moreover, each land 38 includes, with respect to the rotational cutting direction, a flat radial forward face 58, a circumferential or peripheral outer edge 60 and a rear face 62 intersecting the rear end of the outer edge 60 and slanting away from the forward face 58 in a direction towards the central body 28, as best seen in FIG. 2. The rear faces 62 of the smaller and larger portions of the land 48 preferably lie in different planes as shown in FIG. 2, although they could just as well, depending ypon the size of the cutter, lie in the same plane.

A first cutting edge for reaming out the old weld 18 and reconditioning the end of the tube 12 is shown at 64, with a radius cut 66 in the forward face immediately adjacent the cutting edge 64. The distal end surface 52 of each land is raked inwardly behind each cutting edge for suitable clearance. Moreover, each outer edge 60 is raked radially inwardly from the distal end surfaces 52 on the order of one-half-to-one degree for clearance. The clearance of the angle of the edge 60 is not totally self-evident in the drawings, but if shown in exaggerated form in FIG. 3, for example, the edge 60 would gradually taper inwardly from the end 52 towards the stepped end area 48.

A second, or counterboring cutting edge is provided at 68 along with a radius cut 70 where the flat front face of each land joins with the radial end surface 48 of the land at the stepped area. The counterboring cutting edge 68 extends radially from the rotary axis as does the reaming edge 64. The peripheral outer edge of land portion 42, like edge 60, is raked inwardly slightly back from the cutting edge 68 towards the proximal end of the cutter for clearance.

It would be noted that, as seen in FIG. 2, the forward face of the diametrically opposed lands 38 lie in common transverse, radially extending planes.

In operation, and with reference to FIG. 6, the purpose of the tool is to remove the old weld 18 between the tube 12 and side wall of the bore 14 of the header 20 in a precise manner, while restoring the critical distance between the end of the tube 12 and the reference seat 70 on the inner face of side wall 16. Accordingly, the cutting tool bit 26 is positioned adjacent the inner face of the side wall 16 and rigidly mounted with respect to the tube 12 by means of mandrel 24 which extends longitudinally through the end area of the tube 12 and is radially expanded to grip the interior wall of the tube by manipulation of the mandrel actuating shaft 74. The mandrel and its operating elements, per se as well as the driving tool head 22, do not form part of the instant invention, but are illustrated to show the manner in which the cutting tool 26 is rigidly held in position adjacent the old weld 18 before the cutting operation begins.

The tool head 22 is provided with means for axially feeding the cutting tool bit 26 along the mandrel shaft 24 into engagement with the old weld 18. The specific means for accomplishing the axial feed do not form a part of this invention and is therefore not illustrated.

Upon axial feeding of cutting tool 26 while the same is rotated by the driving head 22, cutting edges 64 will ream out the old weld 18 and reface the end of the tube 12 at a precise location from the reference seat 70, while the seat 70 itself is counterbored and resurfaced by cutting edges 68. After the cutting operation, the entire tool assembly is removed from the tube 12, leaving a refinished reference seat 70 and a reconditioned tube end ready for welding by precise automatic welding equipment to reestablish the weld 18 between the end of tube 12 and the side wall of the bore.

It will be apparent that various modifications to the reaming and counterboring tool can be made by persons skilled in the art without departing from the spirit and scope of the invention, as defined in the claims set forth below.

I claim:

1. A rotary reaming and counterboring tool for use with an axially extending mandrel comprising:

a central tool body extending axially along the tool rotary axis, the body including a proximal and distal end, said proximal end including a generally radially extending portion transversely larger than said distal end;

a plurality of longitudinally and radially extending lands on said central body between its proximal and distal ends, and straight flutes between the lands;

axial apertures extending through the transversely larger portion of the proximal end between the lands;

said lands each comprising longitudinally and radially stepped, generally trapezoidal cross sectional elements having, with respect to the rotational cutting direction, a flat radial forward face; a peripheral outer edge; and a rear face intersecting the rear end of said outer face and inclined away from said front face in a direction towards the central body;

said lands each having distal end portions projecting axially beyond said central body, and terminating at distal end surfaces;

each land having a radially larger portion located towards the proximal end of the central body, the intersection of the smaller and larger portions of each land constituting a longitudinally and radially stepped area including a radial end surface;

first and second forward facing radial cutting edges located respectively at the distal end and stepped area of each land; and the distal and stepped end surfaces of each land being cut behind each cutting edge to provide clearance angles for the respective cutting edges;

said central body including a mandrel receiving bore extending completely therethrough along the rotary axis of the central body;

said lands each including, at their axially projecting distal ends, inner surfaces spaced radially outwardly from the diameter of said bore;

said land forward faces each including radius cuts adjacent each cutting edge;

said land rear faces comprising flat surfaces intersecting said central body in the flute area;

an undercut section disposed where each radial end face at said stepped area intersects the smaller land portion;

said radially extending proximal end portion of said central body comprising a mounting flange having a greater transverse dimension, e.g., diameter, than said larger portions of said lands; and said outer circumferential edge of each land being raked radially inwardly adjacent each cutting edge for clearance.

2. A rotary reaming and counterboring tool as claimed in claim 1, including a rotary driving tool head; a mandrel extending along the rotary axis of the tool head; a mandrel actuator for causing the mandrel to engage a workpiece to secure the tool head and workpiece together with the tool movable axially along the mandrel towards and away from the workpiece; said mounting flange attached to said tool head by removable fasteners extending through said axial apertures; and said mandrel extending through said mandrel receiving bore in said central body in sliding relationship.

* * * * *